(12) United States Patent
Castinado et al.

(10) Patent No.: US 10,997,117 B2
(45) Date of Patent: May 4, 2021

(54) PLATFORM-INDEPENDENT ARCHITECTURE FOR REAL-TIME DATA PROCESSING

(71) Applicant: BANK OF AMERICA CORPORATION, Charlotte, NC (US)

(72) Inventors: Joseph Benjamin Castinado, North Glenn, CO (US); Chung-Di Chou, Wilmington, DE (US); Bonnie L. Dolan, Lincoln, CA (US); Lee Ann Proud, Ponte Vedra, FL (US); Lisa Janette Ebba Weekes, Waxhaw, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 329 days.

(21) Appl. No.: 16/018,905

(22) Filed: Jun. 26, 2018

(65) Prior Publication Data

US 2019/0392044 A1    Dec. 26, 2019

(51) Int. Cl.

| G06F 17/30 | (2006.01) |
|---|---|
| G06F 16/11 | (2019.01) |
| G06F 3/06 | (2006.01) |
| G06F 11/14 | (2006.01) |
| G06F 16/27 | (2019.01) |
| G06F 16/23 | (2019.01) |

(52) U.S. Cl.
CPC ............ *G06F 16/116* (2019.01); *G06F 3/065* (2013.01); *G06F 3/067* (2013.01); *G06F 3/0607* (2013.01); *G06F 11/1487* (2013.01); *G06F 16/2379* (2019.01); *G06F 16/275* (2019.01)

(58) Field of Classification Search
CPC .. G06F 16/116; G06F 16/2379; G06F 16/275; G06F 3/0607; G06F 3/065; G06F 3/067; G06F 11/1487
See application file for complete search history.

(56) References Cited

U.S. PATENT DOCUMENTS

| 5,974,146 | A | 10/1999 | Randle et al. |
|---|---|---|---|
| 6,594,647 | B1 | 7/2003 | Randle et al. |
| 9,849,364 | B2 | 12/2017 | Tran et al. |
| 10,552,810 | B1 * | 2/2020 | Ethington ............ G06Q 20/042 |

(Continued)

*Primary Examiner* — Huawen A Peng
(74) *Attorney, Agent, or Firm* — Michael A. Springs; Moore & Van Allen PLLC; R. W. McCord Rayburn (57) ABSTRACT

A real-time data processing system is provided comprising a memory device with computer-readable program code stored thereon, a communication device in communication with a network, and a processing device operatively coupled to the memory device and the communication device. The system establishes an operable communication linkage with a first entity system and a second entity system, the first entity system and the second entity system sharing access to a resource repository stored on the second entity system. The system generates a repository image of the resource repository and tracks an interaction with the resource repository in real-time. Based on the tracked interaction, the system synchronizes the repository image with the resource repository, wherein synchronizing the repository image comprises mirroring the interaction on the repository image and updating the first entity system based on the repository image.

20 Claims, 4 Drawing Sheets (56) References Cited

U.S. PATENT DOCUMENTS

| | | | |
|---|---|---|---|
| 2006/0106717 A1* | 5/2006 | Randle | G06Q 20/12 705/45 |
| 2012/0136781 A1 | 5/2012 | Fridman et al. | |
| 2015/0379510 A1 | 12/2015 | Smith | |
| 2016/0055583 A1* | 2/2016 | Liberty | G06Q 40/02 705/37 |
| 2016/0132884 A1 | 5/2016 | Fridman et al. | |
| 2017/0004501 A1 | 1/2017 | Ledford et al. | |
| 2017/0345019 A1 | 11/2017 | Radocchia et al. | |
| 2019/0208414 A1 | 7/2019 | Roennow et al. | |
| 2019/0303920 A1* | 10/2019 | Balaraman | H04L 9/0637 |

* cited by examiner

PLATFORM-INDEPENDENT ARCHITECTURE FOR REAL-TIME DATA PROCESSING

BACKGROUND

With the development of improved rapid interaction completion systems, there exists a need for a data processing method wherein a user or entity may view a full life-cycle of an available data record in real-time.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system, method and computer program product for real-time data processing. In one embodiment, the system comprises a memory device with computer-readable program code stored thereon; a communication device in communication with a network; and a processing device operatively coupled to the memory device and the communication device, wherein the processing device is configured to execute the computer-readable program code to: establish an operable communication linkage with a first entity system and a second entity system, the first entity system and the second entity system sharing access to a resource repository stored on the second entity system; generate a repository image of the resource repository; track an interaction with the resource repository in real-time; synchronize the repository image with the resource repository based on the interaction, wherein synchronizing the repository image comprises mirroring the interaction on the repository image; and update the first entity system based on the repository image.

In another embodiment, updating the first entity system further comprises: determining a system format of the first entity system; and transmitting an update to the first entity system with the interaction based on the system format of the first entity system.

In another embodiment, the processing device is further configured to execute the computer-readable program code to: determine that the first entity system has been upgraded to an alternative system format; and transmit an update to the first entity system with the interaction based on the alternative system format.

In yet another embodiment, determining the system format of the first entity system further comprises: transmitting an update to the first entity system in a first system format; determining that the first system format is not compatible with the first entity system; and in response to determining that the first system format is not compatible with the first entity system, automatically transmitting the update to the first entity system in a second system format.

In yet another embodiment, the first format is a real-time settlement format and the second format is an end-of-period batch-process settlement format.

In yet another embodiment, the system format of the first entity system is an end-of-period batch-process settlement format, and the processing device is further configured to execute the computer-readable program code to: generate a record of the interaction in an internal data store; determine an end of a period associated with the system format of the first entity system; and transmit the update to the first entity system with the interaction at the end of the period.

In yet another embodiment, the first entity system comprises a plurality of subsystems having a plurality of subsystem formats, and wherein the processing device is further configured to execute the computer-readable program code to transmit the update to the plurality of subsystems based on a subsystem format of each of the plurality of subsystems.

In yet another embodiment, updating the first entity system based on the repository image comprises a settlement of the interaction on the first entity system.

In yet another embodiment, the second entity system is an intermediary system configured to process interactions associated with a plurality of entity systems.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

As used herein, the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), personal digital assistant (PDA), a mobile Internet accessing device, or other mobile device. Other types of mobile devices may include portable digital assistants (PDAs), pagers, wearable devices, mobile televisions, gaming devices, laptop computers, cameras, video recorders, audio/video player, radio, global positioning system (GPS) devices, or any combination of the aforementioned. In some embodiments, a device may refer to an entity's computer system, platform, servers, databases, networked devices, or the like. The device may be used by the user to access the system directly or through an application, online portal, internet browser, virtual private network, or other connection channel. The device may be a computer device within a network of connected computer devices that share one or more network storage locations.

As used herein, the term "computing resource" or "computing hardware" may be used to refer to elements of one or more computing devices, networks, or the like available to be used in the execution of tasks or processes. A computing resource may include processor, memory, network bandwidth and/or power used for the execution of tasks or processes. A computing resource may be used to refer to available processing, memory, and/or network bandwidth and/or power of an individual computing device as well a plurality of computing devices that may operate as a collective for the execution of one or more tasks (e.g., one or more computing devices operating in unison or nodes of a distributed computing cluster).

A "user" as used herein may refer to any entity or individual associated with the real-time data processing platform. In some embodiments, a user may be a computing device user, a phone user, a mobile device application user, a financial institution customer (e.g., an account holder or a person who has an account (e.g., banking account, credit account, or the like)), a system operator, database manager, a support technician, and/or employee of an entity. In some embodiments, identities of an individual may include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

In accordance with embodiments of the invention, the term "entity" may be used to include any organization or collection of users that may interact with the system. An entity may refer to a business, company, or other organization that either maintains or operates the system or requests use and accesses the system. The terms "financial institution" and "financial entity" may be used to include any organization that processes financial transactions (e.g., a transfer of funds or other monetary or financial resources) including, but not limited to, banks, credit unions, savings and loan associations, investment companies, stock brokerages, resource management firms, insurance companies and the like. In specific embodiments of the invention, use of the term "bank" is limited to a financial entity in which account-bearing customers conduct financial transactions, such as account deposits, withdrawals, transfers and the like. In other embodiments, an entity may be a business, organization, a government organization or the like that is not a financial institution. An "entity" may further be used to refer to an intermediary entity such as the Clearing House (TCH) or the Federal Reserve.

"Authentication information" is any information that can be used to identify a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing device, or the like to access, write, delete, copy, or modify data within at least a portion of the system.

To "monitor" is to watch, observe, or check something for a special purpose over a period of time. The "monitoring" may occur periodically over the period of time, or the monitoring may occur continuously over the period of time. In some embodiments, a system may actively monitor a database or data archive, wherein the system reaches out to the database and watches, observes, or checks the database for changes, updates, and the like. In other embodiments, a system may passively monitor a database, wherein the database provides information to the system and the system then watches, observes, or checks the provided information. In some embodiments a system, application, and/or module may monitor a user input into the system. In further embodiments, the system may store said user input during an interaction in order to substantially replicate said user input at another time.

As used herein, a "connection" or an "interaction" may refer to any communication between one or more users, one or more entities or institutions, and/or one or more devices or systems within the system environment described herein. For example, an interaction may refer to a transfer of data or resources (i.e., funds) between systems, devices, and/or application; an accessing of stored data by one or more devices; a transmission of a requested task; a reporting and correction of an error; or the like. In another example, an interaction may refer to a user interaction with a user device through a user interface in order to connect or communicate with an entity and/or entity system to complete an operation (e.g., request a transfer of funds from an account, complete a form, or the like). In another embodiment, an "interaction" may refer to a financial transaction executed between two or more users and/or entities (e.g., a transfer of resources (i.e., funds)).

As used herein, a "real-time interaction" refers to a resource transfer between users and/or entities participating in and leveraging a settlement network operating in real or near real-time (e.g., twenty-four hours a day, seven days a week), wherein settlement of the interaction occurs at or very close in time to the time of the interaction. A real-time interaction may include a payment, wherein a real-time interaction system enables participants to initiate credit transfers, receive settlement for credit transfers, and make available to a receiving participant funds associated with the credit transfers in real-time, wherein the credit transfer may be final and irrevocable. Real-time interactions or payments provide marked improvements over conventional interaction clearing and payment settlement methods (e.g., automated clearing house (ACH), wire, or the like) which can require several hours, days, or longer to receive, process, authenticate a payment (i.e., clearing), and make funds available to the receiving participant which may, in total, require several back-and-forth communications between involved financial institutions. In some cases, conventional settlement methods may not be executed until the end of the business day (EOB), wherein payments are settled in batches between financial institutions.

Real-time interactions reduce settlement time by providing pre-authentication or authentication at the time of a requested interaction in order to enable instantaneous or near-instantaneous settlement between financial institutions at the time of the interaction, wherein resources or funds may be made immediately available to a receiving participant (i.e., payee) following completion of the interaction. Examples of real-time interactions include business to business interactions (e.g., supplier payments), business to consumer interactions (e.g., legal settlements, insurance claims, employee wages), consumer to business interactions (e.g., bill pay, hospital co-pay, payment at point-of-sale), and peer to peer (P2P) interactions (e.g., repayment or remittance between friends and family). In a specific example, a real-time interaction may be used for payment of a utility bill on the due date of the bill to ensure payment is received on-time and accruement of additional fees costs due to late payment is avoided. In another example, real-time interactions may be especially beneficial for small entities and users (e.g., small merchants/businesses) that may have a heavier reliance on short-term funds and may not prefer to wait days for transaction settlements.

Real-time interactions not only provide settlement immediacy, but also provide assurance, reduced likelihood of unauthorized access, and bank-grade security to payments due to the inherent nature of the payment and user authentication infrastructure. Further, real-time interactions may reduce payment processing costs due to the simplified nature of required communication when compared to conventional settlement methods. In some embodiments, real-time interaction systems further include information and conversation tools that financial institutions may utilize to enhance a settlement experience for participants.

A system leveraging a real-time interaction settlement network allows for an interaction, transaction, payment, or the like to be completed between participating parties (e.g., financial institutions and/or their customers) via an intermediary clearing house acting in the role of a neutral party. Participant accounts are held at the clearing house and administered by both the participant and the clearing house. In this way, the clearing house is able to transfer resources or funds between the participant accounts on behalf of the participants in order to settle interactions. A real-time interaction settlement network is discussed in further detail with respect to FIG. 2.

Embodiments of the invention leverage real-time payment technology in a nonconventional way to present a holistic view of a full interaction life-cycle to a user or entity. The invention generates an image of a resource repository (e.g., an account) maintained by an intermediary entity (e.g., the Federal Reserve). The image is synchronized with the actual resource repository, wherein any actions applied to the actual resource repository are also applied to the image in real-time. In this way, the invention solves the technical problem of how to provide an accurate view of resource inflows and outflows of resource repository maintained by an intermediary, as an exact status is typically unknown due to traditional settlement and clearing methods. This allows for an entity to more efficiently utilize idle, excess resources normally reserved for conservatively covering any potential interactions with the resource repository to instead be used for other, more productive tasks (e.g., lending, internal user, investing, etc.).

Figure 1:
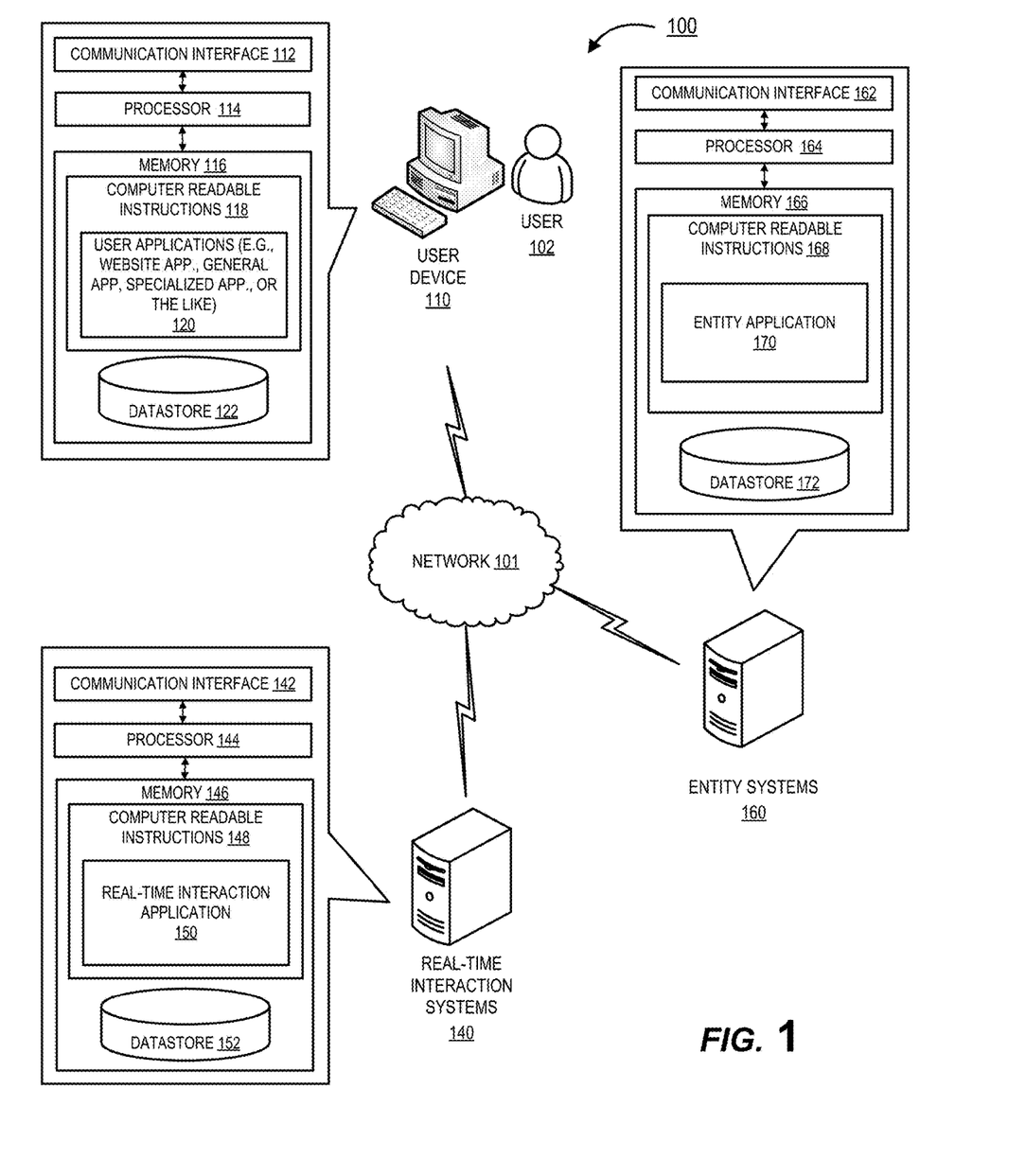
FIG. 1 provides a real-time interaction system environment, in accordance with one embodiment of the invention.

FIG. 1 provides a system that includes specialized systems and devices communicably linked across a distributive network of nodes required to perform the functions of implementing the real-time data processing system as described herein. FIG. 1 provides a real-time data processing system environment 100, in accordance with one embodiment of the present invention. As illustrated in FIG. 1, the real-time interaction system 140 is operatively coupled, via a network 101 to the user device 110 and one or more entity systems 160 (e.g., financial entity systems). In this way, the real-time interaction system 140 can send information to and receive information from the user device 110 and the entity system 160. FIG. 1 illustrates only one example of an embodiment of the system environment 100, and it will be appreciated that in other embodiments one or more of the systems, devices, or servers may be combined into a single system, device, or server, or be made up of multiple systems, devices, or servers.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 is an individual, entity, or system that desires to implement the real-time data processing system over the network 101, such as by initiating, settling, and/or monitoring a transaction. In some embodiments a user 102 is a user or entity completing a transaction leveraging a real-time interaction system (e.g., a payor or payee). In other embodiments, the user 102 is an entity such as a financial institution entity clearing and settling payments. In some embodiments, the user 102 has a user device 110, such as a mobile phone, tablet, or the like that may interact with a device of another user and/or the systems and devices described herein to monitor or clear and settle one or more transactions.

It is understood that the servers, systems, and devices described herein illustrate one embodiment of the invention. It is further understood that one or more of the servers, systems, and devices can be combined in other embodiments and still function in the same or similar way as the embodiments described herein.

As illustrated in FIG. 1, the user device 110 may generally include a processing device or processor 114 communicably coupled to devices such as, a memory device 116, user output devices (for example, a user display device, or a speaker), user input devices (such as a microphone, keypad, touchpad, touch screen, and the like), a communication device or network interface device 112, a power source, a clock or other timer, a visual capture device such as a camera, a positioning system device, such as a geo-positioning system device like a GPS device or the like and the like. The processing device 114 may further include a central processing unit, input/output (I/O) port controllers, a graphics controller or GPU, a serial bus controller and a memory and local bus controller.

The processor 114 may include functionality to operate one or more software programs or applications, which may be stored in the memory 116. For example, the processor 114 may be capable of operating applications such as the user application 120. The user application 120 may be configured to allow the user device 110 to transmit and receive data and instructions from the other devices and systems. The user device 110 comprises computer-readable instructions 118 and data storage 122 stored in the memory device 116, which in one embodiment includes the computer-readable instructions 118 of a user application 120. In some embodiments, the user application 120 allows a user 102 to access and/or interact with content provided from an entity or an account maintained by an entity. In some embodiments, the user application 120 further includes a client for accessing a real-time interaction clearing and settlement hub for viewing a life cycle of an interaction in real-time. In this way, the user 102 may have a holistic view of available resources instead of being reliant on the uncertainty of traditional, end-of-period settlement methods. The user application 120 may also allow the user to manage and view detailed information related to a plurality of past and/or pending interactions.

The processor 114 may be configured to use the communication interface 112 to communicate with one or more other devices on a network 101 such as, but not limited to the real-time interaction system 140 and the entity system 160. In this regard, the communication interface 112 may include an antenna operatively coupled to a transmitter and a receiver (together a "transceiver"), modem. The processor 114 may be configured to provide signals to and receive signals from the transmitter and receiver, respectively. The signals may include signaling information in accordance with the air interface standard of the applicable BLE standard, cellular system of the wireless telephone network and the like, that may be part of the network 101. In this regard, the user device 110 may be configured to operate with one or more air interface standards, communication protocols, modulation types, and access types. By way of illustration, the user device 110 may be configured to operate in accordance with any of a number of first, second, third, and/or fourth-generation communication protocols and/or the like. For example, the user device 110 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 110 may also be configured to operate in accordance with non-cellular communication mechanisms, such as via a wireless local area network (WLAN) or other communication/data networks. The user device 110 may also be configured to operate in accordance Bluetooth® low energy, audio frequency, ultrasound frequency, or other communication/data networks.

The user device 110 may also include a memory buffer, cache memory or temporary memory device operatively coupled to the processor 114. Typically, one or more applications 120 are loaded into the temporarily memory during use. As used herein, memory may include any computer readable medium configured to store data, code, or other information. The memory 116 may include volatile memory, such as volatile Random Access Memory (RAM) including a cache area for the temporary storage of data. The memory 116 may also include non-volatile memory, which can be embedded and/or may be removable. The non-volatile memory may additionally or alternatively include an electrically erasable programmable read-only memory (EEPROM), flash memory or the like.

FIG. 1 further provides a block diagram of the real-time interaction system 140, in accordance with one embodiment of the invention. The real-time interaction system 140 generally comprises a communication interface 142, a processor 144, and a memory 146. As used herein, the term "processing device" or "processor" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processor 144 is operatively coupled to the communication interface 142 and the memory 146. The processor 144 uses the communication interface 142 to communicate with the network 101 and other devices on the network 101, such as, but not limited to the user device 110 and the entity system 160. As such, the communication interface 142 generally comprises a modem, server, transceiver, or other device for communicating with other devices on the network 101.

The real-time interaction system 140 comprises computer-readable instructions 148 stored in the memory 146, which in one embodiment includes the computer-readable instructions 148 of a real-time interaction application 150. In some embodiments, the memory 146 includes data storage 152 for storing data related to the system environment, but not limited to data created and/or used by the real-time interaction application 150. In one embodiment, the data store or data storage 152 of the real-time interaction system may store a record of one or more interactions (i.e., payments) and/or an image of a resource repository (e.g., a general ledger, demands deposit account, escrow account, or the like) that mirrors an actual resource repository.

Embodiments of the real-time interaction system 140 may include multiple systems, servers, computers or the like maintained by one or many entities. FIG. 1 merely illustrates one of those systems that, typically, interacts with many other similar systems, such as the entity systems 160, to complete and settle interactions in real-time. In some embodiments, the real-time interaction system 140 may be part of an entity system 160 or vice versa. The real-time interaction system 140 may communicate with the entity system 160 and the user device 110 via a secure connection generated for secure encrypted communications between the systems.

In one embodiment of the real-time interaction system 140, the memory 146 stores a real-time interaction application 150. In one embodiment of the invention, the real-time interaction application 150 may associate with applications having computer-executable program code that instructs the processor 144 to operate the network communication interface 142 to perform certain communication functions described herein. In one embodiment, the computer-executable program code of an application associated with the real-time interaction application 150 may also instruct the processor 144 to perform certain logic, data processing, and data storing functions of the application.

The processor 144 is configured to use the communication interface 142 to gather data, such as data corresponding to transactions or interactions from various data sources such as the entity systems 160. The processor 144 stores the data that it receives in the memory 146. The memory 146 may further comprise stored user account information (e.g., account number, routing number, user identifying information, etc.). In some embodiments, the real-time interaction system 140 may include a controller configured to interact with the one or more other systems of the environment 100 (e.g., access and extract data), wherein the controller may be used to execute the one or more steps and processes described herein.

FIG. 1 further provides a block diagram of one or more entity systems 160, in accordance with one embodiment of the invention. In one embodiment, the entity system 160 may refer to an intermediary entity system (e.g., TCH, the Federal Reserve). The entity system 160 generally comprises a communication interface 162, a processor 164, and a memory 166. The processor 164 is operatively coupled to the communication interface 162 and the memory 166. The processor 164 uses the communication interface 162 to communicate with the network 101 and other devices on the network 101, such as, but not limited to the user device 110 and the real-time interaction system 140. As such, the communication interface 162 generally comprises a modem, server, transceiver, or other device for communicating with other devices on the network 101.

The entity system 160 further comprises computer-readable instructions 168 stored in the memory 166, which in one embodiment includes the computer-readable instructions 168 of an entity application 170. In some embodiments, the memory device 166 includes data storage 172 for storing data related to the system environment 100, but not limited to data created and/or used by the entity system 160, the user device 110, or the real-time interaction system 140.

Embodiments of the entity system 160 may include multiple systems, servers, computers or the like maintained by one or many entities. In some embodiments, the real-time interaction system 140 is distinct from the entity system 160. The entity system 160 may communicate with the real-time interaction system 140 via a secure connection generated for secure encrypted communications between the two systems.

In one embodiment of the entity system 160, the memory 166 stores an entity application 170. In some embodiments, the memory 166 stores data including, but not limited to, at least portions of a transaction record comprising a record of one or more real-time interactions. In one embodiment of the invention, the entity application 170 may associate with applications having computer-executable program code that instructs the processor 164 to operate the network interface 162 to perform certain communication functions involving described herein. In one embodiment, the computer-executable program code of an application 170 may also instruct the processor 164 to perform certain logic, data processing, and data storing functions of the application.

The processor 164 is configured to use the communication interface 162 to gather data, such as data corresponding to transactions, such as a transaction record of real-time payments or interactions as well as one or more events associated with the interactions from various data sources such as other real-time interaction system 140. In some embodiments, the processor 164 may be configured to store a mirror of a resource repository in the memory 166 (e.g., in data store 172), wherein the entity system 160 may maintain a detailed record of a series of interactions that is updated in real-time based on an actual resource repository. In this way, the entity system 160 may track interactions and resource flows accurately in real-time instead of relying on traditional end-of-period, batch-processing clearing and settlement methods.

Figure 2:
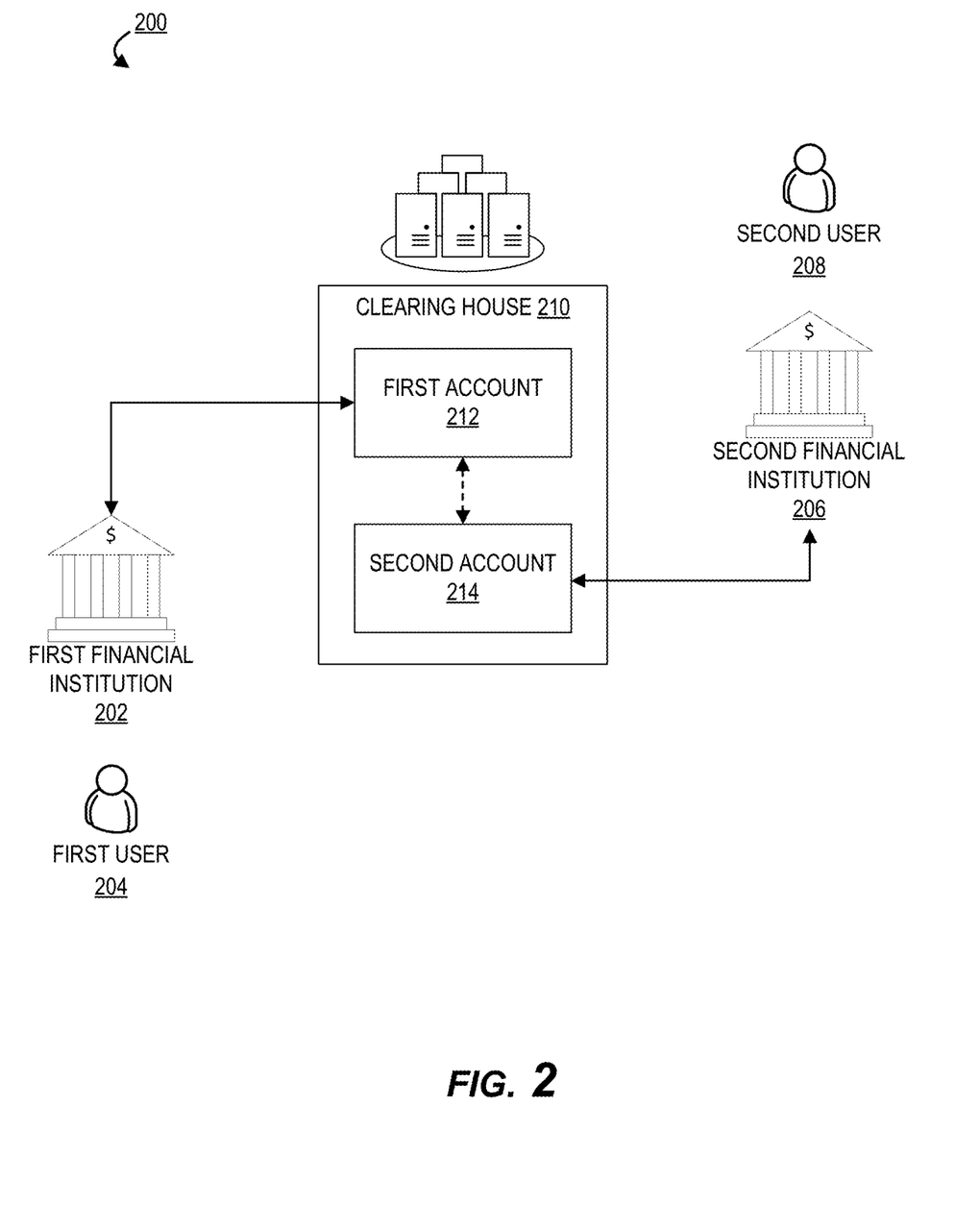
FIG. 2 provides a block diagram of a high-level real-time interaction flow environment, in accordance with one embodiment of the invention.

FIG. 2 illustrates a block diagram of a high-level real-time interaction flow environment 200, in accordance with one embodiment of the invention. In the illustrated environment, a first user 204 is associated with (i.e., a customer of) a first financial institution 202 and a second user 208 is associated with a second financial institution 206. A clearing house 210 comprises a first account 212 associated with the first financial institution 202 and a second account 214 associated with the second financial institution 206. The first account 212 and the second account 214 are accessible by each associated financial institution and the clearing house 210 which acts as a trusted intermediary during settlement between the financial institutions. Resources or funds may be transferred by each financial institution to and from their associated account. Transfers between the first account 212 and the second account 214 are administered by the clearing house 210 pending authentication and authorization by participating parties of each transfer.

In one embodiment, the first user 204 and the second user 208 are participants of a real-time interaction system, wherein the first user 204 (i.e., the payor) initiates a credit transfer to the second user 208 (i.e., the payee). In a specific example, the first user 204 is required to initiate the transfer from the first financial institution 202, wherein the first user 204 provides authentication information to authenticate the identity of the first user 204 and to validate that an account of the first user 204 held at the first financial institution 202 contains at least enough available funds to fulfill the transfer. While in one embodiment, the first user 204 is required to initiate the transfer from a physical, brick-and-mortar location of the first financial institution 202, in alternative embodiments described herein, the transfer may be initiated from other locations wherein a user is not required to be at a brick-and-mortar location (e.g., via an electronic application, a website, or the like).

The first user 204, as the sending participant (i.e., payor), is required to authenticate his or her identity by providing information or credentials to the associated financial institution. For example, authentication information may include account numbers, routing numbers, PIN numbers, username and password, date of birth, social security number, or the like, or other authentication information as described herein. In some embodiments, authentication may comprise multi-factor or multi-step authentication in accordance with information security standards and requirements.

Upon initiating an interaction, the first user 204 becomes obligated to pay the amount of the interaction, wherein the interaction cannot be canceled by the first user 204 following initiation and transmission of communication to a receiving participant. The second user 208, as the receiving participant (i.e., the payee), receives communication to accept payment following similar user authentication requirements. Communication between participants for the interaction is transmitted between the financial institutions via the clearing house 210 which directs the payment to the appropriate financial institution associated with the receiving participant. The transfer of funds occurs between the financial institution accounts 212 and 214 associated with the financial institutions 202 and 206 on behalf of their associated users, wherein the interaction may be settled immediately, concurrent with the interaction. As settlement occurs between the representative financial institutions, debiting and crediting of individual user accounts may be managed at each financial institution with their associated customers. As the interaction is settled immediately, funds may be made available for use in real or near real-time.

It should be understood that while the illustrated embodiment of FIG. 2 depicts only first and second users, financial institutions, and accounts, other embodiments of a real-time interaction network may comprise a plurality of accounts associated with a plurality financial institutions. In some embodiments, the environment 200 may further comprise more than one clearing house 210 (e.g., TCH, the Federal Reserve, and the like) that receive and process interaction requests as described herein. Financial institutions may include one or more community banks, regional banks, credit unions, corporate banks, direct connect financial institutions, and the like.

Figure 3:
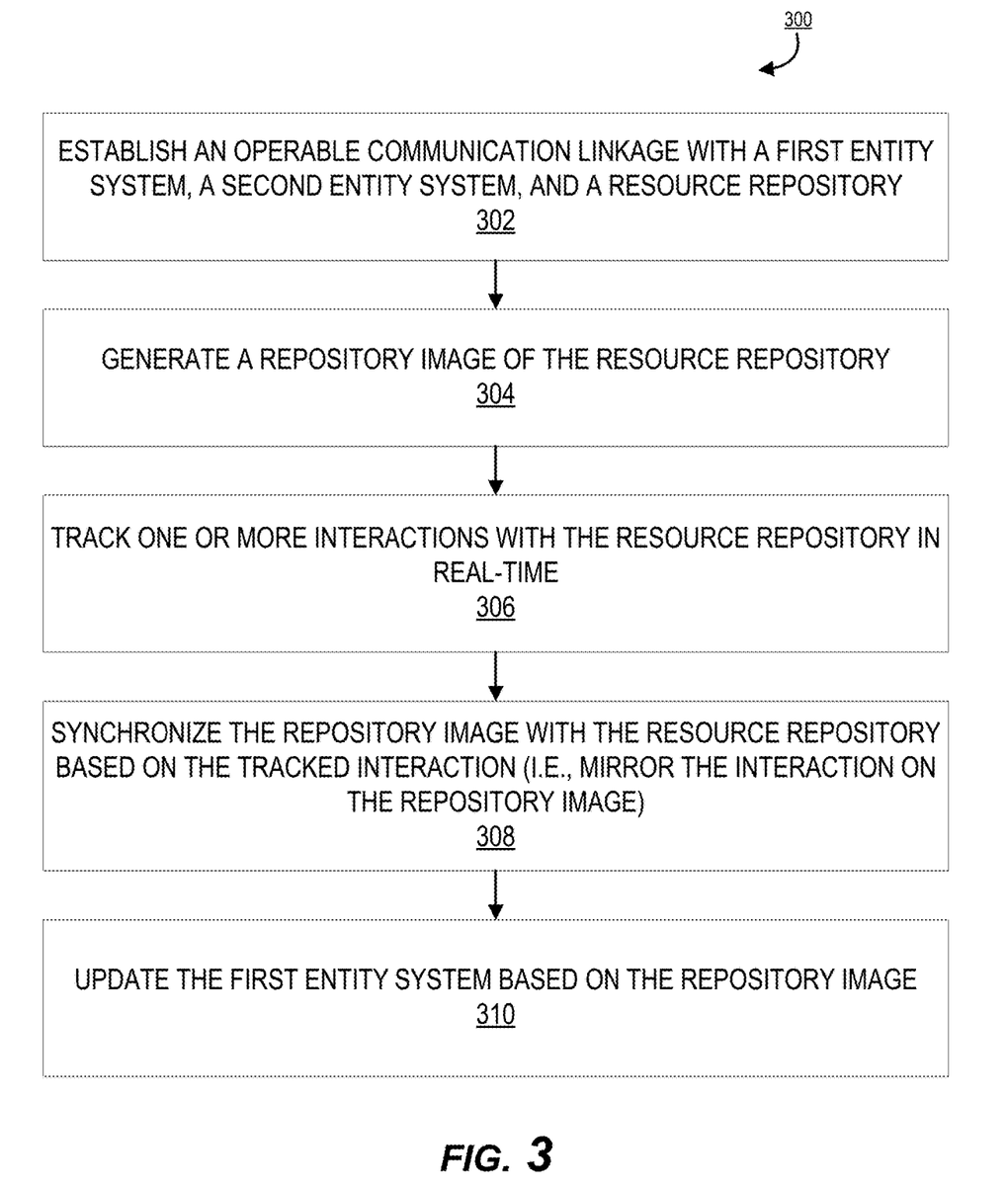
FIG. 3 provides a high level process flow illustrating real-time interaction data processing, in accordance with one embodiment of the invention.

FIG. 3 provides a high-level process flow illustrating real-time interaction data processing, in accordance with one embodiment of the invention. As illustrated in block 302 of FIG. 3, the system initially establishes an operable communication linkage with one or more entity systems. In some embodiments of the invention, an entity system may be a user device (e.g., an account holder device), a financial entity system or financial institution system (e.g., a bank), intermediary entity system (e.g., TCH, the Federal Reserve, or the like), and/or any combination of the above. In a specific example, an account holder or customer of a first bank may utilize the system described herein by transferring funds (i.e., an interaction) using a user device to a second account holder associated with a second bank, wherein clearing and settlement of the fund transfer between the first and second banks may be overseen and managed by the intermediary entity such as the TCH or the Federal Reserve.

Each of the financial entities involved in an interaction (e.g., banks) may individually have access to entity accounts maintained by the intermediary and/or intermediary entity system. Typically, the entity accounts are overseen by the intermediary and act as resource repositories for the financial entities to securely and reliably conduct resource (i.e., funds) transfers between the financial entities. As multiple financial entities maintain accounts with the intermediary, resources may be transferred between the accounts held at the intermediary. For example, a bank may typically maintain a predetermined amount of funds in an account at the Federal Reserve in order to cover any resource transfers (i.e., withdrawals and deposits) in a period of time. However, financial entities may not have detailed knowledge of the exact amount of available funds in an associated account at a particular time due to the rapid nature of regular transfers and slow reporting times inherent to traditional clearing and settlement systems and methods. Due to a poor position with the Federal Reserve, a financial entity may not have an accurate assessment of an amount of funds required in the account to cover transfers at any given time, thus the financial entity is usually required to maintain an overly conservative amount of funds in the account in response to this uncertainty. However, any funds in excess of those actually required may be seen as underutilized or idle, wherein the excess funds could be utilized in other more efficient ways (e.g., lending, internal use, investing, or the like) rather than sitting idly in the financial entity's account with the Federal Reserve. Further, due to typical end-of-day, batch processing clearing and settlement methods, a financial entity may be required to wait to receive detailed knowledge of an account status (e.g., balance).

As illustrated in block 304, the system generates an image of the resource repository. In one embodiment, a resource image is a mirrored copy of the resource repository maintained at the intermediary. In some embodiments, the repository image is stored on an entity system 160 such as the system of a financial entity with an account maintained by an intermediary. In another embodiment, the repository image may be stored on and maintained by the real-time interaction system 140, wherein an entity may access the repository image through an interactive payment clearing and settlement hub provided by the real-time interaction system 140. In some embodiments, the repository image may be a virtual account loaded with representative funds, wherein the repository image is only used to mirror and track an actual amount of resources (i.e., funds) stored in an actual resource repository at any given time. In one example, a financial entity may maintain a resource repository of $50 million at the Federal Reserve. The system generates an image of the resource repository that represents the $50 million stored in the actual account. The repository image may be manipulated or modified by the financial entity or the systems described herein to predict or model actual funds available in the actual resource repository at any point in time.

As illustrated in block 306, the system generates the image of the resource repository in order to track one or more interactions that may occur with the resource repository (e.g., inflows and outflows of funds from the repository). In some embodiments, an interaction is a payment, resource transfer between accounts, or the like. In some embodiments, an interaction may further comprise one or more events such as authorization of a resource transfer, posting of a resource transfer, an exception in a resource transfer, clearing and/or settlement of a resource transfer, and the like.

In some embodiments, the system receives notifications (e.g., in a clearing and settlement hub application, real-time interaction application, or the like) of one or more interactions and events associated with the resource repository via the established operable communication channel with the other entities (e.g., the intermediary entity (i.e., the Federal Reserve)) in real-time as they occur to the resource repository. In response, the system is able to leverage the real-time connection with the intermediary to synchronize the image of the resource repository with the actual resource repository based on the tracked interaction as illustrated in block 308. The system executes the same actions on the image as they occur to the actual resource repository and updates the financial entity system (i.e., posts executed interactions) based on the synchronized image as illustrated in block 310. The system allows a financial entity to be aware of all resource inflows and outflows in real-time, wherein the financial entity may be enabled to utilize excess resources in an account with an intermediary entity (e.g., the Federal Reserve) instead of allowing the excess resources to remain idle due to uncertainty. By leveraging the real-time interaction system, the system is able to generate and provide an accurate, up-to-date copy of the resource repository from which a financial entity can efficiently manage resource flows without the typical constraints introduced through traditional batch-processing clearing and settlement as previously discussed.

In some embodiments, the system may determine an error or discrepancy between the synchronized image and the actual resource repository (e.g., missing interactions, additional interactions, repeat interactions, incorrect interaction amounts, failed transmission of a notification/update, or the like). For example, the synchronized image may have been updated to reflect 15 new interactions, however, in reality, 18 new interactions were performed on the actual resource repository. In some embodiments, the system may automatically identify errors by generating and interaction and comparing the record with the actual interactions received at time of settlement (e.g., end of day). In some embodiments, the system may trigger an exception process upon identifying potential errors or discrepancies in the synchronization or updating processes.

In another embodiment, an error may be caused by an outage event (e.g., a power outage, network outage, natural disaster, or the like), wherein the system may automatically record a time and/or duration of the outage event. In response to the outage event, the system may automatically trigger an exception process, wherein a notification of the exception along with recorded information related to the outage event is transmitted to a support system and/or support technician for research and resolution. The support technician may investigate the period during the outage event identified by the system for potential errors. In yet another embodiment, the system may leverage artificial intelligence, machine learning, business logic, or the like to automatically determine outage events and appropriate response actions to be performed based on specific outage events, wherein a support technician may not be required to research and resolve potential errors.

Figure 4:
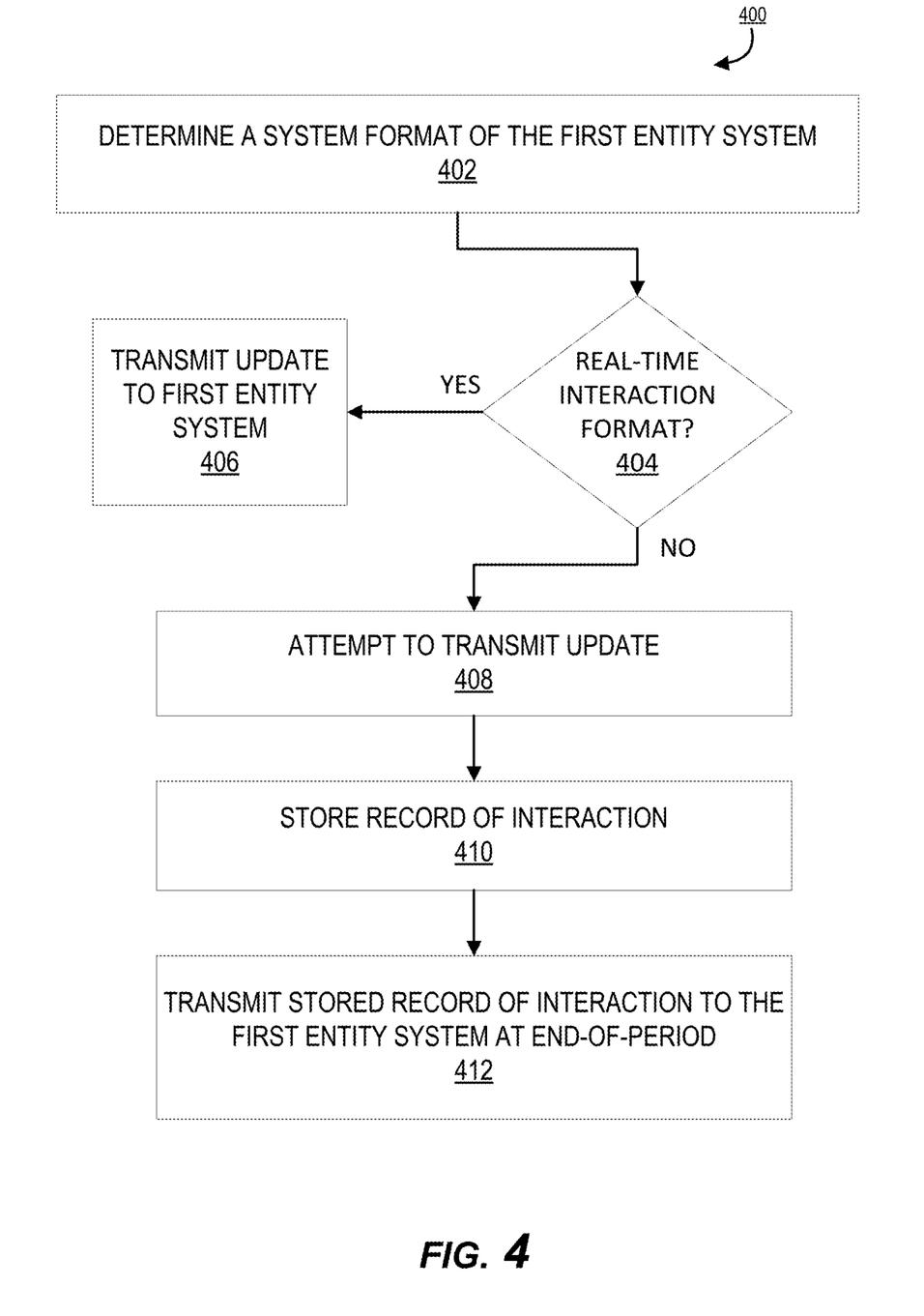
FIG. 4 provides a high level process map for automatically updating entity systems based on a determined entity system format, in accordance with one embodiment of the present invention.

FIG. 4 provides a high-level process flow for automatically updating entity systems based on a determined system format, in accordance with one embodiment of the invention. As illustrated in block 402 of FIG. 4, the system initially determines a system format of an entity system (i.e., a financial entity system) for updating. System formats, may include, for example, a real-time interaction format, a batch processing format occurring at the end of a period, or other formats for processing or settling interactions (i.e., resource transfers). In some embodiments, the format of an entity system, such as a financial entity system receiving an update, may be predetermined, wherein the system stores a record of known system formats of entity systems and transmits updates to each entity system based on the record. In some embodiments, the entity systems may be required to notify the real-time interaction system of a change in system format in order for the real-time interaction system to transmit an update in the correct system format. In other embodiments, the system may automatically determine a system format and a format to transmit an update to the entity system.

As illustrated in block 404 of FIG. 4, the system determines whether the entity system to be updated has a system format compatible with or able to accept an update in a real-time interaction format. If the entity system has a compatible system format, the process flow 400 proceeds to block 406 where the system transmits the update to the entity system based on the determined system format, that is, the system format has a real-time interaction compatible format, and the entity system is updated in real-time when an interaction or an event occurs.

If the system determines that the entity system does not have a system format compatible with or able to accept an update in a real-time interaction format (e.g., a mainframe or a batch-processing format), the flow proceeds to block 408, where in some embodiments, the system may initially attempt to transmit the update in the real-time interaction format as part of the determination of the entity system format. The update may be rejected or produce an error indicating a failure to transmit the update, wherein the system determines that the entity system format is not compatible or able to accept the update in a real-time interaction format. Alternatively, the attempt or a failed attempt at transmitting the update may trigger an entity system format update of the entity system allowing the entity system to receive the update in the real-time interaction format. In some embodiments, the system may routinely attempt to transmit an update in a real-time interaction format to an incompatible system to determine if the incompatible entity system has been upgraded to a real-time interaction format.

As illustrated in block 410 of FIG. 4, in response to rejection or presence of an error in the attempt to update the entity system using the real-time interaction format, the system creates and stores a record of the interactions and events included in the update for later use. For example, the entity system may reject the update in the real-time interaction format due to the entity system having an older, incompatible system format (e.g., a mainframe or a batch-processing format) and can only be updated (i.e., settled) at the end of a regular period (e.g., end-of-business, end-of-day, end-of-month, etc.). By storing the record of interactions and updating the incompatible entity system at a later time, the system accommodates the older system format while still allowing the incompatible entity system to benefit from the real-time monitoring of the repository image even if the incompatible entity system cannot receive the update (i.e., settlement) in real-time. The incompatible entity system may still track all interactions and events in the clearing and settlement hub provided by the system described herein. In this way, the real-time interaction system may operate independent of platform, programming language, protocol, system format, or the like and interface with a variety of disparate entity systems.

Finally, as illustrated in block 412 of FIG. 4, the system transmits the stored record of the interactions to the entity system (i.e., old format) at a determined end-of-period. In some embodiments, the system determines an appropriate end of period at which to transmit the update to the entity system from the determined system format of the entity system. For example, the system may transmit and update to the entity system at an end of business to a batch processing type entity system.

In some embodiments, then entity system may comprise a plurality of subsystems having a plurality of subsystem formats, wherein the system may transmit the update to the plurality of subsystems based on a subsystem format associated with each of the individual subsystems. For example, an entity system may comprise subsystems having a mixture of real-time interaction formats and batch processing formats. The system is configured to transmit the update to each of the subsystems individually depending on an associated subsystem format of each subsystem.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with real-time payment clearing and settlement.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include obj ect-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for real-time payment clearing and settlement, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for real-time data processing, the system comprising:
 a memory device with computer-readable program code stored thereon;
 a communication device in communication with a network; and
 a processing device operatively coupled to the memory device and the communication device, wherein the processing device is configured to execute the computer-readable program code to:
  establish an operable communication linkage with a first entity system and a second entity system, the first entity system and the second entity system sharing access to a resource repository stored on the second entity system, wherein the resource repository comprises an actual account;
  generate a repository image of the resource repository, wherein the repository image comprises a virtual account with representative resources corresponding to actual resources in the resource repository;
  track interactions with the resource repository in real-time, wherein the interactions comprise inflows of actual resources to the resource repository and outflows of actual resources from the resource repository;

synchronize the repository image with the resource repository based on the interactions, wherein synchronizing the repository image comprises mirroring the interactions on the repository image by increasing, based on the inflows of actual resources to the resource repository, the representative resources in the virtual account and decreasing, based on the outflows of actual resources from the resource repository, the representative resources in the virtual account;

provide, to the first entity system, access to the repository image through an interactive payment clearing and settlement hub, wherein the interactive payment clearing and settlement hub comprises notifications in real-time based on the inflows of actual resources to the resource repository and the outflows of actual resources from the resource repository;

determine an error between the repository image and the resource repository, wherein the error is caused by an outage event;

automatically record a time and duration of the outage event; and automatically trigger, in response to the outage event, an exception process, wherein the exception process comprises transmitting, to a support system, a notification comprising the time of the outage event, the duration of the outage event, and information associated with the outage event.

2. The system of claim 1, wherein the processing device is configured to execute the computer-readable program code to update the first entity system based on the repository image, wherein updating the first entity system comprises:
determining a system format of the first entity system; and
transmitting an update to the first entity system based on the system format of the first entity system.

3. The system of claim 2, wherein the processing device is further configured to execute the computer-readable program code to:
determine that the first entity system has been upgraded to an alternative system format; and
transmit the update to the first entity system based on the alternative system format.

4. The system of claim 2, wherein determining the system format of the first entity system further comprises:
transmitting the update to the first entity system in a first system format;
determining that the first system format is not compatible with the first entity system; and
in response to determining that the first system format is not compatible with the first entity system, automatically transmitting the update to the first entity system in a second system format.

5. The system of claim 4, wherein the first system format is a real-time settlement format and the second system format is an end-of-period batch-process settlement format.

6. The system of claim 2, wherein the system format of the first entity system is an end-of-period batch-process settlement format, and the processing device is further configured to execute the computer-readable program code to:
generate records of the interactions in an internal data store;
determine an end of a period associated with the system format of the first entity system; and
transmit the update to the first entity system at the end of the period.

7. The system of claim 2, wherein the first entity system comprises a plurality of subsystems having a plurality of subsystem formats, and wherein the processing device is further configured to execute the computer-readable program code to transmit the update to the plurality of subsystems based on a subsystem format of each of the plurality of subsystems.

8. The system of claim 1, wherein the processing device is configured to execute the computer-readable program code to update the first entity system based on the repository image, wherein updating the first entity system based on the repository image comprises a settlement of the interactions on the first entity system.

9. The system of claim 1, wherein the second entity system is an intermediary system configured to process interactions associated with a plurality of entity systems.

10. A computer program product for real-time data processing, wherein the computer program product comprises at least one non-transitory computer readable medium comprising computer readable instructions, the computer readable instructions, when executed by a computer processor, cause the computer processor to:
establish an operable communication linkage with a first entity system and a second entity system, the first entity system and the second entity system sharing access to a resource repository stored on the second entity system, wherein the resource repository comprises an actual account;
generate a repository image of the resource repository, wherein the repository image comprises a virtual account with representative resources corresponding to actual resources in the resource repository;
track interactions with the resource repository in real-time, wherein the interactions comprise inflows of actual resources to the resource repository and outflows of actual resources from the resource repository;
synchronize the repository image with the resource repository based on the interactions, wherein synchronizing the repository image comprises mirroring the interactions on the repository image by increasing, based on the inflows of actual resources to the resource repository, the representative resources in the virtual account and decreasing, based on the outflows of actual resources from the resource repository, the representative resources in the virtual account;
provide, to the first entity system, access to the repository image through an interactive payment clearing and settlement hub, wherein the interactive payment clearing and settlement hub comprises notifications in real-time based on the inflows of actual resources to the resource repository and the outflows of actual resources from the resource repository;
determine an error between the repository image and the resource repository, wherein the error is caused by an outage event;
automatically record a time and duration of the outage event; and
automatically trigger, in response to the outage event, an exception process, wherein the exception process comprises transmitting, to a support system, a notification comprising the time of the outage event, the duration of the outage event, and information associated with the outage event.

11. The computer program product of claim 10, wherein the computer readable instructions, when executed by a computer processor, cause the computer processor to update the first entity system based on the repository image, wherein updating the first entity system comprises:
determining a system format of the first entity system; and transmitting an update to the first entity system based on the system format of the first entity system.

12. The computer program product of claim 11, wherein the computer readable instructions, when executed by the computer processor, cause the computer processor to:
determine that the first entity system has been upgraded to an alternative system format; and
transmit the update to the first entity system based on the alternative system format.

13. The computer program product of claim 11, wherein determining the system format of the first entity system further comprises:
transmitting the update to the first entity system in a first system format;
determining that the first system format is not compatible with the first entity system; and
in response to determining that the first system format is not compatible with the first entity system, automatically transmitting the update to the first entity system in a second system format.

14. The computer program product of claim 13, wherein the first system format is a real-time settlement format and the second system format is an end-of-period batch-process settlement format.

15. The computer program product of claim 11, wherein the system format of the first entity system is an end-of-period batch-process settlement format, and wherein the computer readable instructions, when executed by the computer processor, cause the computer processor to:
generate records of the interactions in an internal data store;
determine an end of a period associated with the system format of the first entity system; and
transmit the update to the first entity system at the end of the period.

16. A computer-implemented method for real-time data processing, the computer-implemented method comprising:
establishing an operable communication linkage with a first entity system and a second entity system, the first entity system and the second entity system sharing access to a resource repository stored on the second entity system, wherein the resource repository comprises an actual account;
generating a repository image of the resource repository, wherein the repository image comprises a virtual account with representative resources corresponding to actual resources in the resource repository;
tracking interactions with the resource repository in real-time, wherein the interactions comprise inflows of actual resources to the resource repository and outflows of actual resources from the resource repository;
synchronizing the repository image with the resource repository based on the interactions, wherein synchronizing the repository image comprises mirroring the interactions on the repository image by increasing, based on the inflows of actual resources to the resource repository, the representative resources in the virtual account and decreasing, based on the outflows of actual resources from the resource repository, the representative resources in the virtual account;
providing, to the first entity system, access to the repository image through an interactive payment clearing and settlement hub, wherein the interactive payment clearing and settlement hub comprises notifications in real-time based on the inflows of actual resources to the resource repository and the outflows of actual resources from the resource repository;
determining an error between the repository image and the resource repository, wherein the error is caused by an outage event;
automatically recording a time and duration of the outage event; and
automatically triggering, in response to the outage event, an exception process, wherein the exception process comprises transmitting, to a support system, a notification comprising the time of the outage event, the duration of the outage event, and information associated with the outage event.

17. The computer-implemented method of claim 16, comprising updating the first entity system based on the repository image, wherein updating the first entity system comprises:
determining a system format of the first entity system; and
transmitting an update to the first entity system based on the system format of the first entity system.

18. The computer-implemented method of claim 17, wherein determining the system format of the first entity system further comprises:
determining that the first entity system has been upgraded to an alternative system format; and
transmitting the update to the first entity system based on the alternative system format.

19. The computer-implemented method of claim 17, wherein determining the system format of the first entity system further comprises:
transmitting the update to the first entity system in a first system format;
determining that the first system format is not compatible with the first entity system; and
in response to determining that the first system format is not compatible with the first entity system, automatically transmitting the update to the first entity system in a second system format.

20. The computer-implemented method of claim 17, wherein the system format of the first entity system is an end-of-period batch-process settlement format, and wherein the computer-implemented method further comprises:
generating records of the interactions in an internal data store;
determining an end of a period associated with the system format of the first entity system; and
transmitting the update to the first entity system at the end of the period.

* * * * *